Oct. 18, 1955
J. W. CHANEY
2,721,106
VERTICALLY ADJUSTABLE TABLE
Filed Nov. 4, 1952
2 Sheets-Sheet 1
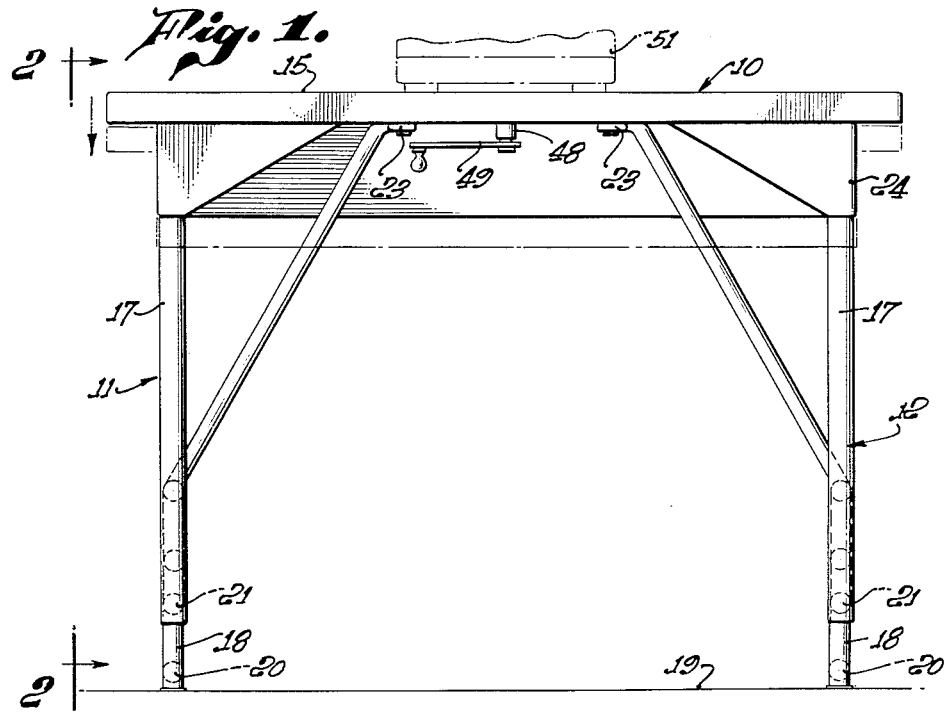
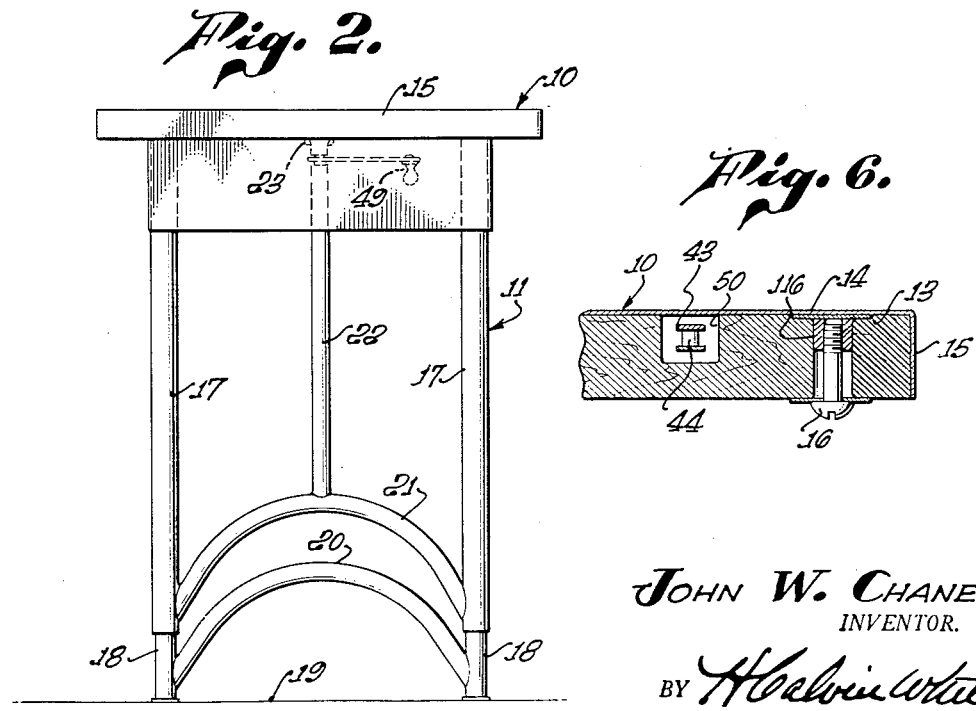
John W. Chaney,
INVENTOR.
BY *H. Calvin White*
ATTORNEY.

Oct. 18, 1955 J. W. CHANEY 2,721,106
VERTICALLY ADJUSTABLE TABLE
Filed Nov. 4, 1952 2 Sheets-Sheet 2
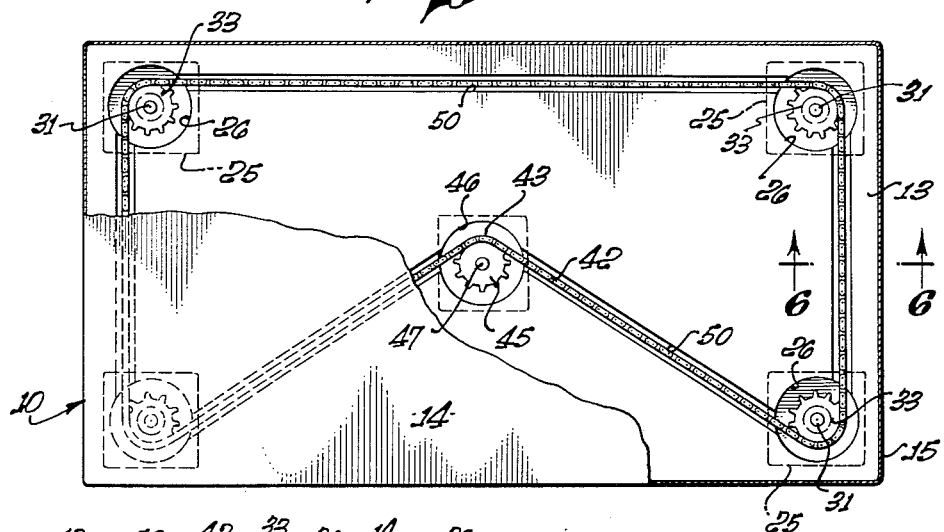
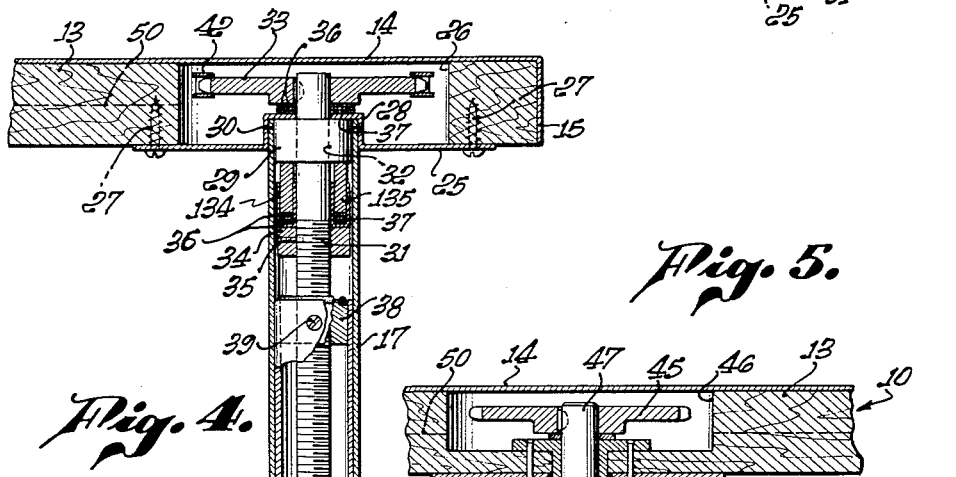
John W. Chaney,
INVENTOR.
Attorney.

United States Patent Office 2,721,106
Patented Oct. 18, 1955

2,721,106

VERTICALLY ADJUSTABLE TABLE

John Walter Chaney, Los Angeles, Calif., assignor to Interstate Engineering Corporation, El Segundo, Calif., a corporation of California Application November 4, 1952, Serial No. 318,615

8 Claims. (Cl. 311—39)

This invention relates to an improved type of vertically adjustable table structure, typically applicable to typewriter stands, desks, drafting tables, or any of various other tables which it may be desired to adjust.

Tables embodying the invention are characterized by a capacity for very precise adjustment in height within a relatively wide range of adjustment, and with a minimum of actuating force being required to effect the adjusting movement. Further, the tables are so designed as to automatically lock in any position to which they may be adjusted. Certain highly important features of the tables have to do with their preferred construction in a manner such that the table has an external appearance which does not indicate that it is other than an ordinary nonadjustable table. For this purpose, the legs and top of the table are preferably hollow, and the adjusting mechanism is contained within these hollow parts.

Structurally, the table includes a top, and a plurality of legs each including two vertically adjustable sections. For adjusting each of the legs, I prefer to provide individual screw and nut mechanisms, which may be contained within the legs. In order to actuate these mechanisms in unison and with maximum simplicity, I find it highly desirable to employ as an actuating element an endless flexible member, which engages and drives a plurality of wheels connected to the screw and nut mechanisms respectively. The endless member and wheels desirably have transverse shoulders interengaging to positively interlock them for movement in unison, and for this reason the member may comprise a chain, with the wheels taking the form of chain driven sprocket wheels.

To attain maximum structural simplicity, and at the same time provide for reception of the drive mechanism in a minimum of space, the endless member is preferably mounted to extend and move generally horizontally, and may be positioned out of sight within a hollow top of the table. The flexible member may be actuated in extremely simple manner by a drive wheel engaging the member and actuable by a handle accessible to a user.

As to the manner of construction of the legs, each may include a pair of telescopically interengaged upper and lower tubes. In order to strengthen the table, I find it helpful to interconnect these legs in two pairs, to form two double leg supporting assemblies. In each of these assemblies, the upper tubes of the two legs forming the assembly may be rigidly interconnected by a first crosspiece extending therebetween, while the lower tubes of those two legs are interconnected by a second crosspiece. An inclined brace may then extend angularly between the table top and the crosspiece which interconnects the two upper tubes.

The above and other features and objects of the present invention will be better understood from the following detailed description of the typical embodiment illustrated in the accompanying drawings, in which:

Fig. 1 is a side view of a vertically adjustable table embodying the invention;

Fig. 2 is an end view of the table taken on line 2—2 of Fig. 1;

Fig. 3 is a plan view of the table, with the upper sheet metal cover of the table top partially broken away to reveal the inner adjusting mechanism;

Fig. 4 is an enlarged fragmentary vertical section of one of the legs of the table;

Fig. 5 is an enlarged fragmentary vertical section through the table at the location of the adjusting handle; and Fig. 6 is an enlarged fragmentary vertical section taken on line 6—6 of Fig. 3.

Referring first to Fig. 1, the illustrated vertically adjustable table includes a rectangular horizontally extending table top 10, and a pair of leg assemblies 11 and 12 projecting downwardly from opposite ends of the top. As best brought out in Figs. 4, 5 and 6, the table top preferably comprises a horizontally extending flat surfaced board 13, to which is attached a sheet metal cover 14, extending across the upper surface of the board and downwardly about its side edges at 15. Sheet metal cover 14 may be attached to board 13 in any suitable manner, as by a number of screws 16 spaced about the table top and extending upwardly through openings in board 13 to threadedly connect with brackets 116 welded to the cover (see Fig. 6).

Referring now to Fig. 2, each of the end leg assemblies 11 and 12 forms a pair of horizontally spaced vertically adjustable legs, projecting downwardly from the table top near two of its corners. Each of these legs includes an outer cylindrical tube 17 connected at its upper end to and projecting downwardly from the table top, and a lower floor engaging tube 18 which projects upwardly within the corresponding tube 17. The internal diameter of the tubes 17 corresponds substantially to the external diameter of tubes 18, to effectively guide the former for telescopic vertical adjusting movement relative to the latter. In the lowermost position of the table top (see broken lines in Fig. 1) outer tubes 17 extend downwardly to a location very near the supporting floor, and inner tubes 18 project upwardly within tubes 17 to a location very near the table top.

The bottom ends of the two lower tubes 18 of each end leg assembly are rigidly interconnected by a transverse frame member 20, which may take the form of an upwardly curving tubular element. Similarly, the lowermost portions of upper or outer tubes 17 are rigidly interconnected by transverse preferably tubular and upwardly curving frame members 21. An inclined rigid brace 22 may extend angularly upwardly and inwardly from a central portion of each crosspiece 21 to a point of connection 23 with the board 13 of the table top. Preferably, a sheet metal skirt 24 extends downwardly from the table top at a location outwardly of the four legs 17, 18. This skirt is typically welded to the upper tubes 17 of the legs, and extends about three sides of the table, but is interrupted at the rear side (seen in Fig. 1) to assure ample leg room for a user of the table.

The upper ends of the upper tubular sections 17 of the various legs are attached to board 13 of the table top by individual horizontally extending sheet metal mounting plates 25 (see Fig. 4). These plates 25 extend across the underside of individual circular holes 26 formed in board 13 at its four corners. The plates are attached to the board by screws 27 positioned about openings 26. At its center, each of the plates 25 has an upwardly and then horizontally turned portion 28, forming a cylindrical recess into which the upper end of an upper tube 17 of one of the table legs is received. The plate is rigidly attached to the corresponding upper leg section 17, and to a rigid externally cylindrical bearing member 29 contained within the leg section, with the attachment preferably being effected by spot welding all three of these parts together at a number of circularly spaced locations 30.

For effecting vertical adjustment of the end leg assemblies, each of the four legs contains an elongated vertically extending adjusting screw 31, projecting downwardly within tubes 17 and 18 from the upper end of tube 17. The upper end portion of each screw 31 is not threaded, and extends vertically through and is journaled within a vertical bore 32 in bearing member 29, to guide the screw for rotation about its vertical axis. At its upper end, each screw 31 carries, within one of the openings 26 in the table top, a sprocket wheel 33, by which the screw is rotated to effect vertical adjustment of the leg sections. The screw is axially or vertically fixed by threading a nut 34 upwardly onto the screw to a point such as that shown in Fig. 4, at which position bearing element 29 is relatively closely confined between the screw carried elements above and beneath it. This nut may be retained in a desired set position by set screw 35. Preferably, thrust bearings of some type are provided directly beneath sprocket wheel 33 and above nut 34. The thrust bearings at each of these locations may include a pair of nylon washers 36, and a metal washer 37 received between the two nylon washers. The lower of these sets of washers may be protected from engagement with screw 31 by reception within an annular sheet metal retainer 134 of upwardly opening U-shaped cross-section, with a solid metal bearing ring 135 being received axially between the washers and element 29 and projecting downwardly into retainer 134.

Each of the adjusting screws 31 threadedly engages and acts against a nut 38 rigidly carried within the upper end of the lower leg section 18. This nut may be fixed to leg section 18 in any suitable manner, as by set screws 39. As will be understood, rotation of screws 31 acts to adjust upper leg sections 17 and the table top relative to nut 38 and lower leg sections 18. To limit upward adjustment of the table top, the screws 31 may carry at their lower ends stop nuts 40, fastened in fixed relation to the screws by set screws 41.

The screw and nut mechanisms of the four legs are actuated in unison by an endless chain 42, which extends horizontally within the table top, and engages all four of the screw actuating sprockets in driving relation. Chain 42 is received and movable within a number of elongated recesses 50 formed in the upper surface of board 13 and closed by sheet metal cover 10 of the table top. Chain 42 is preferably of the type conventionally used in bicycles, comprising a number of rigid articulately interconnected links 43 having spaced transversely extending pins 44 acting to engage and drive the sprockets of wheels 33. In passing from one end of the table to the other, chain 42 extends angularly inwardly to a central portion of the table, at which it passes about a fifth sprocket wheel 45, received within a central circular recess 46 in the upper side of board 13. This fifth sprocket wheel 45, like the other four, is rotatable about a vertical axis, and acts to drive the chain 42 for actuating the various adjusting screws. Sprocket wheel 45 is rigidly carried by a drive shaft 47, which projects downwardly through a bearing element 48, and carries a rotary handle 49 at the under side of the table top. The illustrated table may be utilized in any situation where a vertically adjustable table is desired. For instance, the table may be used as a support for a typewriter 51, as seen in Fig. 1. When a user desires to adjust the table top, he merely rotates handle 49 at the under side of the table, to linearly advance endless chain 42 within the table top, and thus actuate the four sprockets 33 in unison. Rotation of the sprockets turns screws 31 to which the sprockets are keyed, so that the screws act against nuts 38 in a manner vertically adjusting upper leg sections 17 and the table top. When a desired table height is reached, the operator ceases to turn handle 49, and the frictional engagement of screws 31 and their associated nuts 38 act to lock the table top in the adjusted position.

It has been found desirable to provide in the table a resilient or cushioning type of stop for limiting downward adjustment of the table. For this purpose, I may position within an annular recess in the upper side of each of the units 38 an O-ring 138, formed of rubber or other resilient material, and engageable and resiliently deformable by the corresponding screw carried nut 34 in the lowermost position of the table.

I claim:

1. An adjustable table comprising an upper assembly and a plurality of leg assemblies projecting downwardly therefrom, each of said leg assemblies including a pair of telescoping metal tubular relatively vertically adjustable upper and lower sections, individual screw and nut actuating mechanisms within and operable to vertically adjust said leg assemblies, individual wheels overlying the upper ends of said leg assemblies for actuating said mechanisms and rotatable about essentially vertical and parallel axes, said upper assemblies including leg mounting means formed separately from said two sections of the leg assemblies and extending laterally from and beyond the upper sections of the leg assemblies and beneath said wheels, an endless flexible member engaging and driving said wheels, and a drive unit for actuating said flexible member, said leg mounting means comprising essentially horizontal plates having upwardly extending tubular portions into which the upper ends of said upper leg sections are connected.

2. An adjustable table as recited in claim 1, in which said plates have upper walls extending partially across the upper ends of said tubular portions, there being rigid reinforcing rings received in said tubular portions of the plates.

3. An adjustable table comprising a top panel consisting essentially of a slab, a plurality of leg assemblies projecting downwardly from and formed separately from said slab and each including a pair of relatively vertically adjustable tubular upper and lower telescoping sections, individual screw and nut actuating mechanisms within and operable to vertically adjust said leg assemblies, said slab containing within its vertical thickness wheel-receiving spaces above said leg sections, individual wheels connected to said mechanisms respectively and contained within said spaces directly above the leg assemblies, means rigidly connecting said leg assemblies to said slab, an endless flexible member contained within said slab and movable along an essentially horizontal path therein and operable to engage said wheels and drive them in unison, and drive means in said slab for actuating said flexible member and adapted to be actuated from the outside of the slab.

4. An adjustable table as recited in claim 3, in which said drive means includes an additional wheel driving said endless member and contained within a space in said slab at an essentially central location therein and actuable from the underside of the slab.

5. An adjustable table comprising a top assembly including a horizontal top panel, a plurality of leg assemblies projecting downwardly from and formed separately from said top panel and each including a pair of relatively vertically adjustable tubular upper and lower telescoping sections, individual screw and nut actuating mechanisms within and operable to vertically adjust said leg assemblies, said top panel containing within its vertical thickness wheel-receiving spaces above and of greater horizontal extent than the telescoping portions of said leg sections, individual wheels connected to said mechanisms respectively and contained within said spaces directly above the leg assemblies, said top assembly including brace means bridging said spaces below said wheels and rigidly interconnecting said upper sections of the leg assemblies with said top panel laterally beyond said spaces, an endless flexible member contained within said top panel and movable along an essentially horizontal path therein and operable to engage said wheels and drive them in unison, and a drive unit for actuating said flexible member and adapted to be actuated from the outside of said top panel.

6. An adjustable table comprising a hollow top panel, a plurality of downwardly projecting adjustable leg assemblies connected to said top panel and each including a pair of relatively vertically adjustable upper and lower telescoping sections, a plurality of mechanisms within said leg assemblies respectively operable to relatively vertically adjust said sections thereof, and means operable to actuate said mechanisms and contained within the vertical dimension of the top panel corresponding to the distance between the top and bottom surfaces of the panel adjacent said leg assemblies, said top panel containing spaces above said leg assemblies within which said wheels are received, said table including a plurality of leg mounting plates carried by the upper sections of said leg assemblies and forming closed connections with the underside of said top panel, each of said plates having an upwardly extending tubular portion within which an upper end of the upper section of a corresponding leg assembly is connected, said leg assembly sections being tubular.

7. An adjustable table as recited in claim 6, in which said plates have horizontal walls extending partially across the upper ends of said tubular portions thereof, said table including rigid reinforcing rings disposed within said upper ends of the upper leg sections at locations within said tubular portions of said plates.

8. An adjustable table comprising a hollow top panel, a plurality of downwardly projecting adjustable leg assemblies connected to said top panel and each including a pair of relatively vertically adjustable upper and lower telescoping sections, a plurality of mechanisms within said leg assemblies respectively operable to relatively vertically adjust said sections thereof, and means operable to actuate said mechanisms and contained within the vertical dimension of the top panel corresponding to the distance between the top and bottom surfaces of the panel adjacent said leg assemblies, said means within the top panel comprising a plurality of wheels at the upper ends of said leg assemblies operable to actuate said mechanisms, an elongated endless flexible member extending and movable along a generally horizontal path and engaging said wheels to actuate them and said mechanisms in unison, and a drive unit also contained in said panel and operable to move said flexible member along an endless path and actuable by a user of the table, said top panel including a lower section formed of wood extending across the major portion of the horizontal area of the panel and containing upwardly opening recess means within which said wheels and endless member are received, and an upper section also extending across the major portion of the horizontal area of the panel and closing the upper sides of said recess means, said upper section being formed of sheet metal and being relatively thin as compared with the wood of the lower section, and said recess means having enlarged portions at the locations of said wheels and reduced width portions for said endless member extending between said enlarged portions.

References Cited in the file of this patent

UNITED STATES PATENTS

| | | |
|---|---|---|
| 918,240 | Wheeler | Apr. 13, 1909 |
| 919,559 | Duff | Apr. 27, 1909 |
| 981,113 | Richards | Jan. 10, 1911 |
| 1,091,615 | Angell | Mar. 31, 1914 |
| 1,943,280 | Arnold | Jan. 16, 1934 |
| 2,249,455 | Caldwell | July 15, 1941 |
| 2,342,631 | Hillenbrand | Feb. 29, 1944 |
| 2,368,748 | Doty | Feb. 6, 1945 |
| 2,547,296 | White | Apr. 3, 1951 |

FOREIGN PATENTS

| | | |
|---|---|---|
| 8,483 | Great Britain | 1906 |